Aug. 11, 1959  W. R. HARRY  2,898,658
METHOD AND APPARATUS FOR THE MANUFACTURE OF CERAMIC WARE
Filed May 23, 1955
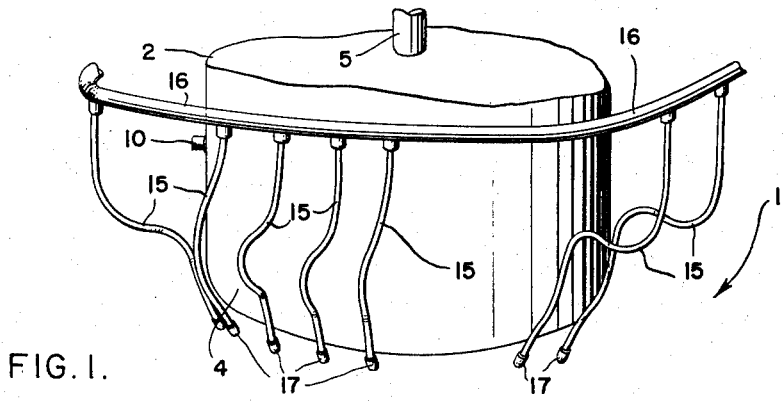
FIG. 1.
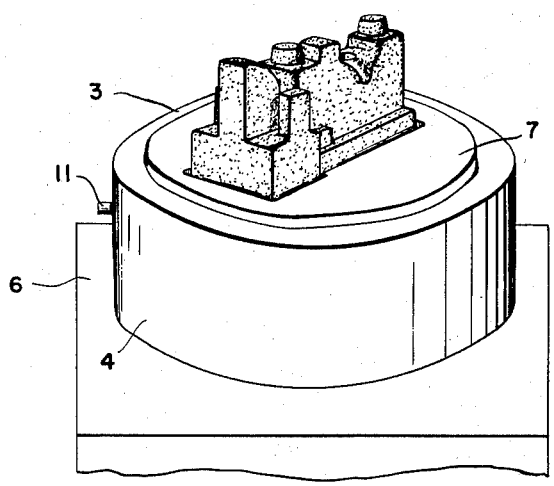
FIG. 2.
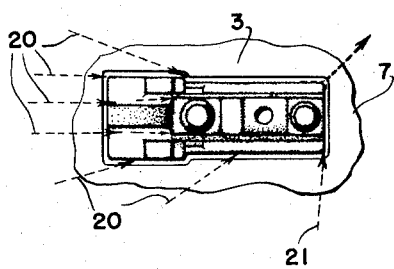
INVENTOR.
WILLIAM R. HARRY
BY
ATTORNEY

United States Patent Office 2,898,658
Patented Aug. 11, 1959

2,898,658

METHOD AND APPARATUS FOR THE MANUFACTURE OF CERAMIC WARE

William R. Harry, Hartland, Wis., assignor to McGraw-Edison Company, a corporation of Delaware Application May 23, 1955, Serial No. 510,266

5 Claims. (Cl. 25—22)

The present invention relates to the manufacture of ceramic ware, and has particular reference to a method and apparatus for the removal of accumulations of moisture from molds used in pressure forming of said ware.

There has recently been introduced to the ceramic manufacturing industry a new and widely accepted apparatus and method of manufacture of ceramic ware which utilizes a fluid release of pressed ware from porous molds. This method of manufacture is taught in the United States Patent No. 2,584,109 entitled "Mold and Method for Molding Ceramic Ware," issued on February 5, 1952, to A. R. Blackburn and Richard E. Steele. The apparatus and procedure consists essentially in the careful spacing and location of conduits supplying a releasing fluid within a porous mold whereby the release of the pressed ware is obtained without substantial distortion or disturbing the internal structure of the clay body formed by the mold. These molds are usually constructed of a material prepared from a high grade of gypsum plaster, and it is preferred to use a hard gypsum cement in view of its extreme hardness, which markedly prolongs the life of the mold.

As with all porous mold applications, including the well-known wet-process casting procedure, wherein porous plaster molds are used, the mold absorbs moisture from the clay batt during pressing operations. A good share of this absorbed moisture is forced from the interstices of the mold during the releasing operation which generally consists of passing air through the permeable conduits and outwardly through the said interstices. Obviously, after a few press operations, there will be an accumulation of water on the mold surfaces, and much of the water, from both mold sections, tends to collect in crevices of the lower mold portion.

The past practice has been to use an absorbent sponge for picking up the moisture accumulations. However, this is a tedious procedure and, in fact, is somewhat abrasive, tending to reduce the life of the mold.

It is, therefore, a primary object of the present invention to provide a method and apparatus for removing the accumulations of water during and after forming operations in the manufacture of pressure-formed ceramic ware.

Another object of the present invention is to provide an auxiliary air supply directed towards the mold and other crevices for physically blowing the water from the vicinity of the mold.

It is a further object of the present invention to provide an auxiliary air supply for removing the accumulations of water collected during forming operations in the manufacture of ceramic ware, wherein said air is supplied from a manifold to a plurality of nozzles having their respective delivery ends directed towards crevices where water tends to accumulate, and further to direct the nozzles in a manner providing jet-like streams of air towards one end of the mold.

It is still another object of the present invention to provide a series of air streams for removing accumulations of water from molds used in pressure-forming ceramic ware, where the greater portion of the said air streams are directed towards one end of the mold, and further to direct the said streams towards one general point of convergence thereby substantially eliminating stagnated areas that would otherwise tend to be caused by oppositely positioned nozzles providing streams that would tend to conflict with one another.

In the drawings:

Fig. 1 is a perspective view illustrating a pair of cooperable molds in open position at the completion of the pressing of the ware to form a clay object of the desired shape with the object having been removed therefrom, and further showing a plurality of conduits or nozzles positioned in accordance with the teachings of the present invention, to be directed towards the lower mold used in preparing a relatively intricate shaped article, such as a porcelain box for an electrical fuse cutout.

Fig. 2 is a plan view, partly in diagram, illustrating the preferred air streams directed towards the removal of accumulations of water in the lower mold section of Fig. 1.

Referring to Fig. 1 of the drawing, a mold, indicated generally by the reference numeral 1, is shown in open position at the end of a pressing operation in which the ware has been shaped and has been removed therefrom. The mold 1 consists of a top mold section 2 and a bottom mold section 3. In the particular case the bottom mold section consists of a male member utilized to form the internal configuration of a fuse cutout box, such as that disclosed in the copending application, Serial No. 432,501, filed May 26, 1954, by William D. Kyle, Jr. and William R. Harry. It will be apparent, however, that the mold sections may be reversed with the female member comprising the bottom mold section. Each mold section comprises an outer shell 4 filled with a suitable porous material which will ordinarily be plaster of Paris or hard gypsum cement. The top mold section 2 is preferably mounted on a connecting rod 5, and a bottom mold section 3 may be mounted on a stationary platform 6, or may be connected to a connecting rod (not shown) for axial movement if so desired. As described, the upper mold section 2 is motivated axially by the connecting rod 5. Excess clay 7 is removed by gutters (not shown) in the lower mold and gradually works radially outwardly from the mold to be later removed and reworked in accordance with recognized shop practice.

Internally of each mold section there is located a series of perforated conduits (not shown) embedded in the porous material and adapted to distribute the releasing fluid throughout the porous mold. The conduits have been described and claimed in greater detail in the above-mentioned copending application, and are connected at one end to an extension 10 and 11 in each of the respective mold sections, which extensions pass through the shell 4 for connection to a flexible line (not shown). The fluid, preferably air, is stored in a suitable reservoir (not shown) and is introduced through the extensions 10 and 11 to the internal conduit.

The usual cycle of operation is as follows: A batt of clay, which has been previously augered and de-aired, is placed on the upper surface of the bottom mold and the molds are actuated towards closed position (not shown). After the pressing operation is completed, the pressure release fluid is preferably admitted first to the extension 11 of the bottom mold section and the fluid flows through the face of the mold 3 and the ware to release the ware from the mold. The pressure exerted by the fluid in the bottom half of the mold is sufficiently high to completely release the ware from the face of the mold, and a fluid film is formed between the ware and the face of the mold.

The molds are then separated to the position shown in Fig. 1, with the ware being retained in the upper mold section 2. After the molds have been completely separated, the ware is released from the upper mold by introducing fluid pressure to the extension 10 and through the porous mold to release the ware from the face of the mold.

It will be obvious that during pressure forming, the porous molds tend to absorb certain amounts of water, and in fact, are preferably kept moistened to facilitate release of the ware and for other reasons owing to the deleterious effects caused by drying out of the gypsum mold at its outer surfaces. There will also be a tendency for accumulations of moisture in the upper mold to drip down upon the lower mold section and collect in the various crevices of the mold itself and around the edges of the mold between the mold and the excess clay 7.

The lower mold section collects in its crevices moisture accumulations as the absorbed water is purged from the interstices therein after each pressing operation, in addition to the fact that occasionally additional purging is necessary after continued pressing operations. This purging is done by merely supplying fluid pressure through the internal mold conduits before a new batt of clay is positioned in the mold.

The present invention contemplates the addition of a plurality of specially located nozzles emanating from an auxiliary air supply manifold. The nozzles 15 communicate at one end with a supply manifold 16 which may be supplied from a suitable air pressure reservoir (not shown). The nozzles 15 are preferably made somewhat flexible of brass or copper tubing in order to provide for minor adjustments, and are preferably fitted at their outer end with tips 17 for providing a preferred orifice dimension.

Although the arrangement shown in Fig. 1 of the various nozzles 15 is preferred for the mold configuration illustrated, it will be apparent, as the description proceeds, that a greater or lesser number of nozzles directed in various arrangements may be made with other mold configurations (not shown). It will also be apparent that though the mold 3 is shown herein with protruding portions, it is within the scope of the present invention to provide nozzles for a mold configuration (not shown) having a cup-like configuration.

If so desired, cocks or valves may be used in connection with the various nozzles to regulate the air pressure of the air stream eminating from any of the respective nozzles.

With reference to Fig. 2, it will be seen that in accordance with the teachings of the present invention, the nozzles are preferably directed to provide air flow in one general direction, in the present case towards the rear of the machine and out of the path of the operator.

It will be noted that the streams 20 tend to converge towards one another without interfering with one another at any place on the mold surface. It has been found that any interference between streams will set up areas of stagnation where pockets of water will remain on the mold surface to defy removal thereof. The stream denoted by the reference numeral 21 (Fig. 2) is directed towards the general point of convergence and acts jointly to redirect moisture from the side of the mold closest thereto and also to remove water from the mold surface substantially tangent therewith. At no time are the streams in interference with one another to cause any eddying or stagnation at the mold surface.

Thus, after each pressing operation, the auxiliary air supply from the manifold 16 may be supplied through the nozzles 15 by either a manually operated valve (not shown) or by means of an automatically controlled valve (not shown).

Although it has been found to be relatively more convenient to mount the manifold 16 and its corresponding nozzles 15 on the upper mold section 2, it will be apparent that the arrangement could be positioned adjacent to the lower section 3, if so desired. However, there is less interference with loading and unloading operations in the arrangement shown. In addition, since the purged moisture tends to leave the porous mold sections in an atomized or vaporous state, there is a tendency for the air streams to simply blow the vapor towards the rear and out of the way. Thus, the mass of air streams moving in one general direction will tend to intercept and carry with it a good share of the atomized water leaving the upper mold before it has a chance to condense into droplets and fall upon the lower mold.

It will now be apparent that the present invention has provided an automatic means for removing accumulations of water from porous mold surfaces by means of a predirected air supply, and which procedure eliminates the need for additional sponging operations requiring additional labor and which tended to abrasively wear away the porous mold surfaces, which surfaces very often must be maintained within strict manufacturing tolerances.

I claim:

1. In the method of pressure-forming ceramic ware comprising the steps of positioning a batt of plastic moist clay between permeable cooperable molds, moving said molds toward one another to form said ware, introducing fluid pressure through one of said molds and against the formed ware while the molds are in final forming position relative to one another, said fluid pressure exerting a force between said mold and said ware to render the ware non-adhering to the mold, separating said molds with the ware adhering to the other of said molds, introducing fluid pressure through said other mold to separate the pressed ware therefrom, and maintaining said molds in their relative separated operating position for subsequent repeated forming operation; the improved step of removing accumulated moisture from at least one of said permeable molds by means of directing non-interfering streams of a fluid drying medium towards moisture accumulating surface of said mold and in a general direction towards one end of said mold for removal of said moisture.

2. In the method of pressure-forming ceramic ware comprising the steps of positioning a batt of plastic moist clay between permeable cooperable molds, moving said molds toward one another to form said ware, introducing fluid pressure through one of said molds and against the formed ware while the molds are in final forming position relative to one another, said fluid pressure exerting a force between said mold and said ware to render the ware non-adhering to the mold, separating said molds with the ware adhering to the other of said molds, introducing fluid pressure through said other mold to separate the pressed ware therefrom, and maintaining said molds in their relative separated operating position for subsequent repeated forming operation; the improved step of removing accumulated moisture from at least one of said permeable molds by means of directing non-interfering streams of a fluid drying medium towards moisture accumulating surfaces of said mold and ultimately towards a general point of convergence of said non-interfering streams.

3. In the method of pressure-forming ceramic ware comprising the steps of positioning a batt of plastic moist clay between permeable cooperable molds, moving said molds toward one another to form said ware, introducing fluid pressure through one of said molds and against the formed ware while the molds are in final forming position relative to one another, said fluid pressure exerting a force between said mold and said ware to render the ware non-adhering to the mold, separating said molds with the ware adhering to the other of said molds, introducing fluid pressure through said other mold to separate the pressed ware therefrom, and maintaining said molds in their relative separated operating position for subsequent repeated forming operation; the improved step of removing accumulated moisture from at least one of said permeable molds by means of directing non-interfering streams of air towards moisture accumulating surfaces of said mold and in a general direction towards one end of said mold for removal of said moisture.

4. In an apparatus for pressure-forming shaped ceramic ware including cooperable molds, for shaping a wet clay mass into a formed clay object, at least one of said molds being porous and containing means for applying fluid pressure against the face of the object adjacent the mold face to remove the object therefrom; means for removing accumulations of moisture from the exterior surfaces of at least one of said molds after removal of said formed object, said means comprising a source of drying fluid under pressure and fluid delivery means in the form of a plurality of nozzles, at least some of which are disposed in non-parallel relation and all of which are connected to said source of drying fluid and directed towards said exterior surfaces to sweepingly remove the accumulations therefrom.

5. In an apparatus for pressure-forming shaped ceramic ware including cooperable molds, for shaping a wet clay mass into a formed clay object, at least one of said molds being porous and containing means for applying fluid pressure against the face of the object adjacent the mold face to remove the object therefrom; means for removing accumulations of moisture from the exterior surfaces of at least one of said molds after removal of said formed object, said means comprising a source of drying fluid under pressure, a manifold connected to said source, and a series of selectively positioned nozzles at least some of which are disposed in non-parallel relation and all being connected at one end to said manifold and each having its delivery end generally directed towards at least one of said molds to provide pressurized drying fluid streams flowing in one general direction towards one end of said mold to sweep the moisture therefrom.

References Cited in the file of this patent

UNITED STATES PATENTS

| | | |
|---|---|---|
| 1,793,089 | Heyes | Feb. 17, 1931 |
| 2,236,644 | Kotcher | Apr. 1, 1941 |
| 2,251,135 | Iknayan et al. | July 29, 1941 |
| 2,380,084 | Strauss | July 10, 1945 |
| 2,385,962 | Barnet | Oct. 2, 1945 |
| 2,453,400 | Barnet et al. | Nov. 9, 1948 |
| 2,529,291 | Graham | Nov. 7, 1950 |
| 2,584,109 | Blackburn et al. | Feb. 5, 1952 |
| 2,615,229 | Blackburn et al. | Oct. 28, 1952 |
| 2,632,227 | Steele et al. | Mar. 24, 1953 |